United States Patent [19]

Temme

[11] 4,363,398

[45] Dec. 14, 1982

[54] SCRAPER-CHAIN CONVEYORS

[75] Inventor: Helmut Temme, Waltrop, Fed. Rep. of Germany

[73] Assignee: Gewerkschaft Eisenhütte Westfalia, Lunen, Fed. Rep. of Germany

[21] Appl. No.: 156,242

[22] Filed: Jun. 4, 1980

[30] Foreign Application Priority Data

Jun. 5, 1979 [DE] Fed. Rep. of Germany ....... 2922826

[51] Int. Cl.³ .............................................. B65G 19/28
[52] U.S. Cl. ..................................................... 198/735
[58] Field of Search .................................. 299/34, 43; 198/723–734, 861; 138/42, 162, 166, 167

[56] References Cited

U.S. PATENT DOCUMENTS 4,026,407 5/1977 Georg ............................... 299/34 X

FOREIGN PATENT DOCUMENTS 2516082 10/1976 Fed. Rep. of Germany ...... 198/733
2323692 11/1978 Fed. Rep. of Germany ...... 138/166

Primary Examiner—John J. Love
Assistant Examiner—Douglas D. Watts
Attorney, Agent, or Firm—Sughrue, Mion, Zinn, Macpeak & Seas

[57] ABSTRACT

A scraper-chain conveyor channel section or pan has side walls interconnected by a floor plate. The underside of the pan along which the lower run of a scraper-chain assembly runs is covered over by a bottom plate which is easily detached. To fasten the bottom plate in position use is made of one or more shaped lateral regions on the bottom plate which engage in an open pocket formed inside a guide provided on the mineral face side wall of the pan. The shaped region or regions and the pocket permit the bottom plate to be swung away from the undersurface of the pan at an angle to permit withdrawal from the pocket. Releasable tension springs hold the bottom plate against the undersurface of the pan.

17 Claims, 3 Drawing Figures

SCRAPER-CHAIN CONVEYORS

BACKGROUND TO THE INVENTION

The present invention relates to scraper-chain conveyors for use in mineral mining and to channel sections or pans therefor.

It is well known to construct a scraper-chain conveyor from a series of channel sections or pans interconnected end-to-end along which a scraper-chain assembly is circulated. It is also well known to construct each pan from a pair of side walls connected together with a welded-in-floor plate and to utilize a bottom plate to cover over the underside of the pan. A conveyor pan of this type is described in German patent specification No. 929,597. In this known construction, the bottom plate is connected to the main structure, i.e. the side walls and floor plate, by way of a hinge connection. This hinge connection permits the bottom plate to be pivoted away from the main structure for access to the lower run of the pan. It is sometimes necessary to remove the bottom plate or else to displace the bottom plate laterally and this involves dismantling the hinge connection by removing the hinge pins. This can be an awkward time-consuming operation. Another disadvantage of this known construction is that the hinge connection is susceptible to soiling and damage in the harsh conditions encountered in a mine working.

A general object of the present invention is to provide an improved pan construction for a scraper-chain conveyor.

SUMMARY OF THE INVENTION

A channel section or pan for a scraper-chain conveyor is composed, as is known, of two side walls interconnected by a floor plate which defines therewith upper and lower runs for a scraper-chain assembly and a bottom plate which covers the lower run from beneath. In accordance with the invention means are provided to define a pocket, preferably, exteriorly adjacent one of the side walls which pocket receives at least one shaped region of the bottom plate. The shaped region co-operates with the pocket to secure or lock the bottom plate in its normal position while the bottom plate can be swung through an angle in relation to the undersurface of the side walls to permit withdrawal and release of the shaped region from the pocket. The bottom plate can be fitted or removed quite easily and quickly and the connection established by the shaped region and the pocket is not particularly susceptible to soiling and damage. By lifting the other side wall remote from the side wall adjacent the pocket for example, visual inspection of the interior of the lower run can take place without necessarily removing the shaped region of the bottom plate from the pocket. Fine material such as coal dust can also be removed from the lower run in a similar manner.

It is preferable to also provide releasable resilient or spring means which biases or holds the bottom plate against the undersurface of the side walls. Conveniently, one or more tension springs can achieve this purpose and these tension springs can be accommodated in a hollow member fixed to the other side wall remote for the pocket. These springs would need to be released to permit any relative pivoting motion between the bottom plate and the side walls.

Various configurations can be adopted for the pocket and the shaped region or regions. For example, the pocket can be provided in a hollow mineral-winning machine guide fixed to the exterior of the side wall of the pan nearest the mineral face of a mine working in which the conveyor is installed. A slot can than be provided between a longitudinal strip or the like and the lower portion of the side wall to permit access to the pocket. Conveniently, the or each shaped region can have an end portion which overlaps and abuts on the strip when the bottom plate adopts its normal position resting on the floor of the mine working and supporting the side walls. The or each shaped region may be cranked or simply be deformed as, e.g. an angular deflection or bend.

A series of components constituting the shaped region can be conveniently fixed, as by welding, into recesses in one of the side edges of the bottom plate. To provide for a more effective retention of the bottom plate it is possible to fix a shaped retention piece such as a dog to the upper surface of the or each shaped region. This dog which can be conveniently welded to the shaped region then lies closely adjacent to or abuts against a lower part of the mineral face side wall of the pan. To release the bottom plate the latter must be pivoted relatively to the side wall undersurface by an angle sufficient to ensure that both the shaped region and its dog can pass through the access slot of the pockets. This means that the width of the slot must be larger than the distance formed by the combination of the height of the dog and the thickness of the bottom plate.

In its broadest aspect the present invention provides the combination of a pan for a scraper-chain conveyor and a bottom plate detachably secured thereto by way of a releasable connection established between a lateral shaped region of the bottom plate engaging in an open pocket formed exteriorly of one of the pan side walls, the shaped region co-operating with the pocket to retain the bottom plate when the latter supports the pan with the bottom plate becoming detachable by relative pivoting between the pan and the bottom plate to permit withdrawal of the shaped region from the pocket.

The invention may be understood more readily, and various other aspects and features may become apparent, from consideration of the following description.

BRIEF DESCRIPTION OF DRAWINGS

Embodiments of the invention will now be described, by way of examples only, with reference to the accompanying drawings, wherein.

DESCRIPTION OF PREFERRED EMBODIMENTS

Figure 1:
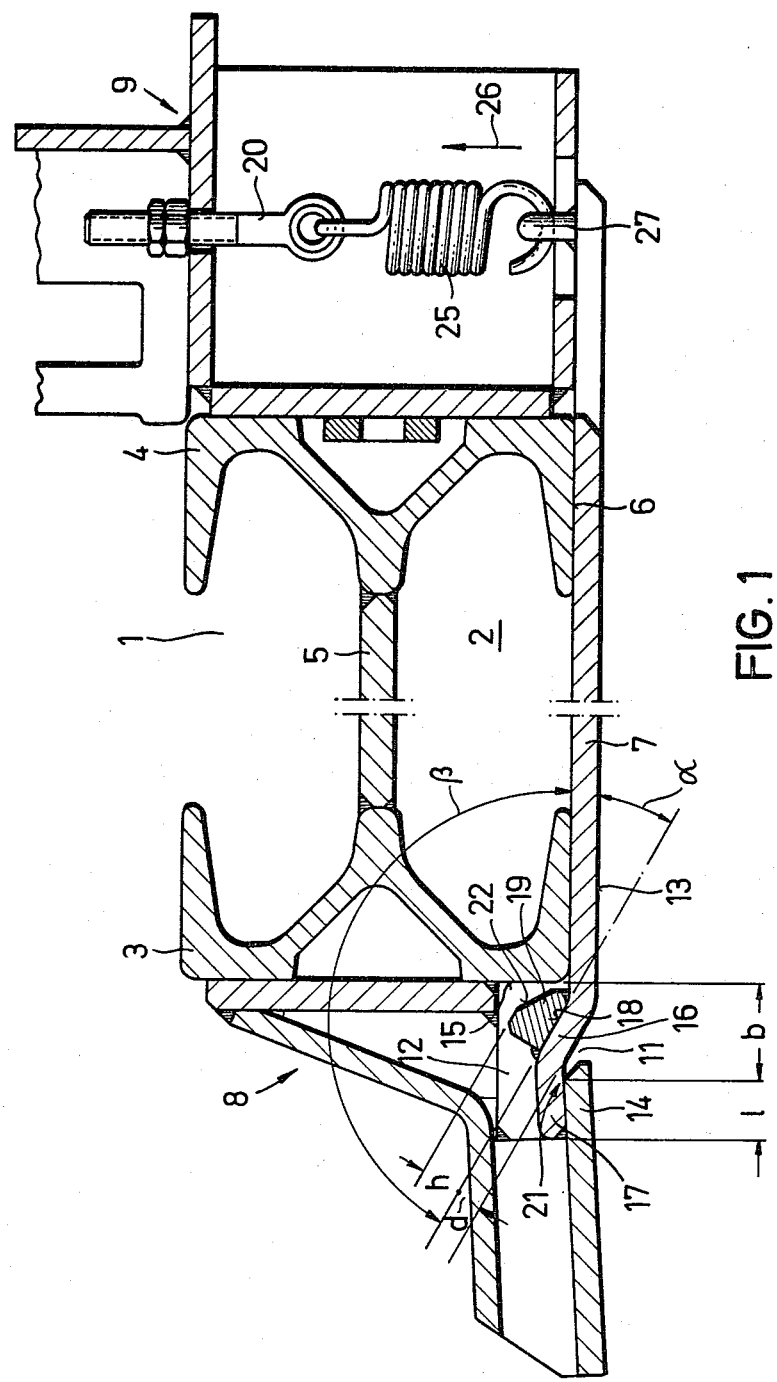
FIG. 1 is a sectional view of part of a scraper chain conveyor constructed in accordance with the invention.
Figure 2:
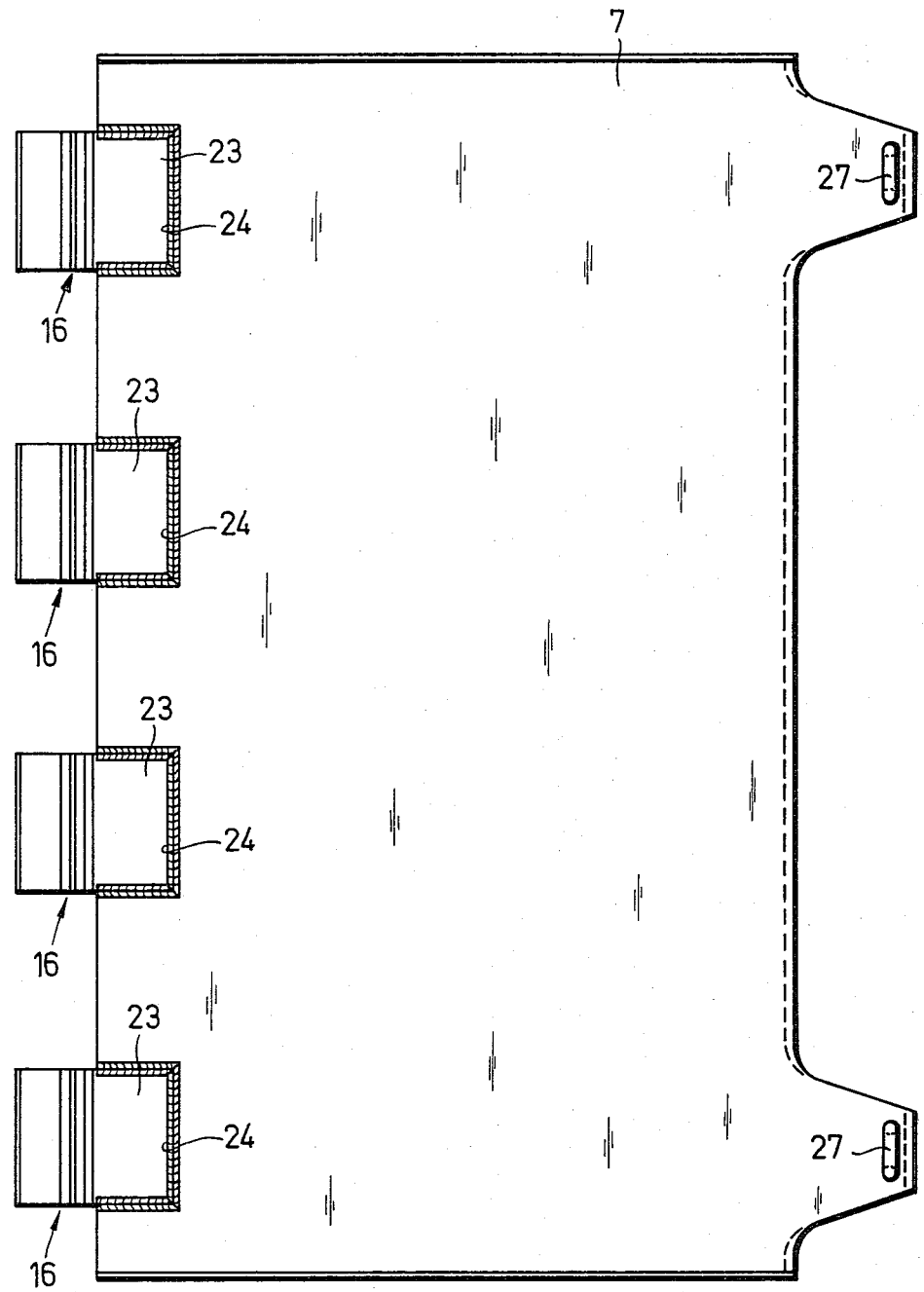
FIG. 2 is a plan view of a bottom plate for use with the conveyor shown in FIG. 1.

As is known, a scraper-chain conveyor for use in mineral mines is composed of a series of channel sections or pans arranged end-to-end, along which a scraper-chain assembly is circulated to effect transference of material. As shown in FIG. 1, each pan of a conveyor in accordance with the invention is constructed, as is known, from two side walls 3, 4 of generally sigma-shaped profile interconnected through a floor plate 5 welded to inwardly-projecting portions of the walls 3 and 4. The scraper-chain assembly (not shown) passes along the pans in upper and lower passages or runs 1, 2. The lower run 2 of each pan is covered over from beneath by means of a bottom plate 7 which normally rests on the floor of the mine working. The lower surfaces 6 of the lower flanges of the side walls 3, 4 in turn rest on the bottom plate 7. For the purposes of this description, it is assumed that the side wall 3 faces the mineral face while the side wall 4 faces the stowage or goaf region of the mine working. A guide 8 is fixed to the exterior of the side wall 3 and serves to support and guide a mineral winning machine, such as a shearer or plough. A further box-like hollow member 9 is fixed to the exterior of the side wall 4 and the member 9 may also serve to support and guide a mineral winning machine. As shown in FIG. 1, a reception pocket 12 is formed within the guide 8 exteriorly of the side wall 3. The bottom plate 7 has one or more shaped regions 16 which locate in the pocket 12. The pocket 12 is delimited by an opening 11 through which the plate 7 gains access to the pocket 12. The opening 11 is formed between a strip or rail 14, a lower part 15 of the side wall 3 and the lower flange of the side wall 3. The lower surface of the strip 14 which rests on the floor of the mine working extends approximately flush with the lower surface 13 of the main body of the bottom plate 7. As shown in FIG. 2, the bottom plate 7, may have a number of shaped regions 16 spaced along the length of its mineral-face side edge. In this embodiment the shaped regions 16 are cranked as shown in FIG. 1 to fit in the pocket 12 and lie over the strip 14 when the bottom plate 7 rests on the floor of the working. It is quite feasible to provide just a single shaped, e.g., cranked region 16 instead of several regions. With the bottom plate 7 fitted in position as shown in FIG. 1 the regions 16 are supported with their end portions 17 by the strip 14 over a distance 'l' with these portions 17 extending parallel to the strip 14 and to the main body of the bottom plate 7. A dog 19 or the like is welded to the upper surface 18 of one or each shaped region 16 as a retention piece to lie closely adjacent the lower part 15 of the side wall 3. The dog 19 thus prevents accidental detachment of the shaped region 16 from the pocket 12 and ensures the bottom plate 7 is locked in its normal operating position. The width "b" of the opening 11 is slightly larger than the sum of the thickness "d" of the bottom plate 7 and the height "h" of the dog 19. This means that the bottom plate 7 can be freely inserted into or withdrawn from the pocket 12 only when it is swung round into a position where its undersurface extends at an angle $\alpha$ of 20° or more in relation to the lower surfaces 6 of the side wall flanges as represented in FIG. 1. The upper surfaces 18 of the shaped regions 16 extend at an angle $\beta$ in relation to the upper surface of the main body of the plate 7, (the crank angle) which is about 120°. This angle $\beta$ can however, be 90° or less. As the bottom plate 7 is swung downwardly to effect its removal from the pocket 12 the plate 7 pivots about a fulcrum 21 on the strip 14. In order to facilitate this motion and the withdrawal of the plate 7 each dog 19 is bevelled at the upper side edge facing the side wall 3 as denoted by reference numeral 22.

The shaped regions 16 of the plate 7 depicted in FIG. 2 may be formed by components 23 preshaped by cold or hot working and welded into recesses 24 in the side edge of the plate 7.

At the side of the bottom plate 7, adjacent the side wall 4, the plate 7 is connected to tension springs 25 which exert a biasing force (arrow 26) on the plate 7 to hold the plate 7 against the lower surfaces 6 of the lower flanges of the side walls 34. The springs 25 are located within the hollow member 9 and engage with screw-threaded shackles 20 depending from an upper wall of the member 9 and with coupling eyes 27 (see FIG. 2) formed at the goaf side edge of the plate 7. The coupling eyes 27 are located on lateral projections or lugs at the goaf side edge of the plate 7 as shown in FIG. 2.

During operation, and as depicted in FIG. 1, the bottom plate 7 rests against the floor of the mine working and is held against the lower flanges of the side walls 3, 4 by the weight of the conveyor pan thereabove and by the force 26 of the springs 25. Should the pan itself become raised from the floor during mineral winning the springs 25 ensure the plate 7 is held in position covering the lower run 2. Since the floor plate 5 is non-detachably welded to the side walls 3, 4 the only way of access to the lower run 2 is from beneath. To provide such access, the springs 25 are released and the conveyor pan is lifted from its goaf side to permit the bottom plate 7 to swing away from the pan about the fulcrum 21. This permits a visual inspection of the lower run 2. If repair and replacement is necessary, it may be preferred to remove the bottom plate 7 by further raising of the pan to permit withdrawal from the pocket 12 as described. If fine material, such as coal dust, finds its way into the lower run and forms obstructions, the pan can be lifted after releasing the springs 25 to permit the material to be removed to the goaf side of the working without releasing the bottom plate 7.

Figure 3:
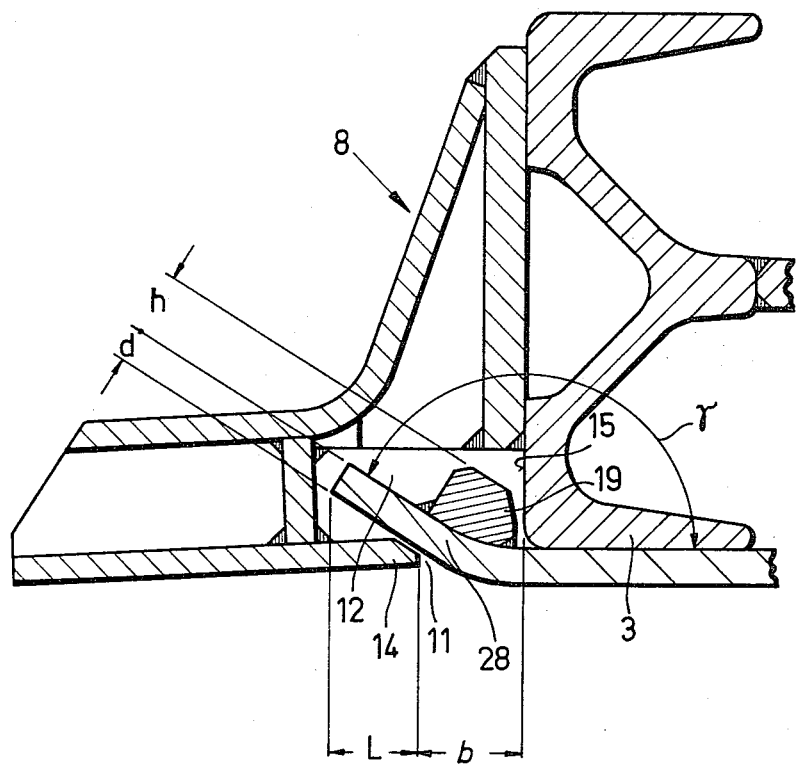
FIG. 3 is a detail sectional view of part of a modified scraper-chain conveyor constructed in accordance with the invention.

The shaped region or regions 16 of the bottom plate 7 need not be cranked as depicted in FIG. 1. In the alternative embodiment depicted in FIG. 3, where like reference numerals denote like parts, the or each shaped region 16 is merely bent upwardly at 28. The or each shaped region 16 overlaps the strip 14 by a distance "L" and the dog 19 thereon abuts or lies closely adjacent the portion 15 of the side wall 3. In contrast to the embodiment of FIG. 1 where the deflection of crank angle $\beta$ of the shaped regions can be less than 120° as illustrated, the equivalent angle $\gamma$ in the FIG. 3 embodiment must be greater than 90°, e.g. 120°, to ensure the or each shaped region 16 properly engages on the strip 14.

The provision of a dog 19 on the or each shaped region 16 of the bottom plate 7 is not essential and especially in the case of the FIG. 1 embodiment were the angle $\beta$ is about 90° the dog 19 can be omitted since the shaped region itself can abut or lie closely adjacent the portion 15 of the side wall 3.

I claim:

1. A pan or channel section for a scraper chain conveyor comprising: side walls; a floor plate extending between said side walls defining upper and lower runs; and means permitting access to said lower run comprising a removable bottom plate which covers the lower run from beneath, said bottom plate having a main body having longitudinal side edges, wherein one of said edges is provided with at least one extension member angulated with respect to said bottom plate, means defining a pocket for receiving said extension member to secure said bottom plate in its normal operating position, said bottom plate being removable only after pivoting said bottom plate and said extension member through an angle with respect to said pocket, and a dog forming a retention piece fixed to the upper surface of said at least one extension member to rotate at least closely adjacent to a roller extension portion of one of the side walls.

2. A pan or channel section for a scraper chain conveyor comprising: side walls; a floor plate extending between said side walls defining upper and lower runs; and means permitting access to said lower run comprising a removable bottom plate which covers the lower run from beneath, said bottom plate having a main body having longitudinal side edges, wherein one of said edges is provided with at least one extension member angulated with respect to said bottom plate, means defining a pocket for receiving said extension member to secure said bottom plate in its normal operating position, the pocket being partly defined by a stripe spaced with a slot from a lower exterior portion of the side walls, the slot permitting excess to the pocket, said bottom plate being removable only after pivoting said bottom plate and said extension member through an angle with respect to said pocket, and a dog forming a retention piece fixed to the upper surface of said one extension member to locate at least closely adjacent to a roller exterior portion of said one side wall.

3. A pan or channel section for a scraper chain conveyor comprising: side walls; a floor plate extending between said side walls defining upper and lower runs; and means permitting access to said lower run comprising a removable bottom plate which covers the lower run from beneath, said bottom plate having a main body having longitudinal side edges, wherein one of said edges is provided with extension members angulated with respect to said bottom plate, means defining a pocket for receiving said extension members to secure said bottom plate in its normal operating position, said bottom plate being removable only after pivoting said bottom plate and said extension member through an angle with respect to said pocket, and wherein said extension members comprise angular elements welded into recesses formed in said bottom plate.

4. A pan according to claim 1 and further comprising releasable spring means for biasing the bottom plate against the undersurface of the side walls.

5. A pan according to claim 1, wherein the pocket is formed within a hollow member fitted to one of the side walls.

6. A pan according to claim 5, wherein the hollow member is a guide for a winning machine.

7. A pan according to claim 1, wherein the pocket is partly defined by a strip spaced with a slot from a lower exterior portion of one of the side walls, the slot permitting access to the pocket.

8. A pan according to claim 7, wherein said at least one extension member has a portion which overlaps and abuts the strip when the bottom plate is in its normal operating position.

9. A pan according to claim 7, wherein the strip is aligned with the main body of the bottom plate when the latter is in its normal operating position.

10. A pan according to claim 1, wherein said at least one extension member is of cranked configuration.

11. A pan according to claim 1, wherein said at least one extension member is formed as an angularly deflected region.

12. A pan according to claim 1, wherein said at least one extension member has an upper surface extending at an angle of at least 90° in relation to the upper surface of the main body of the bottom plate.

13. A pan according to claim 1, wherein said at least one extension member has an upper surface extending at an angle of at least 120° in relation to the upper surface of the main body of the bottom plate.

14. A pan according to claim 1, wherein a dog forming a retention piece is fixed to the upper surface of said at least one extension to locate at least closely adjacent to a lower exterior portion of one of the side walls.

15. A pan according to claim 2, wherein the width of the slot is larger than the distance formed by the combination of the height of the dog and the thickness of the bottom plate.

16. A pan according to claim 1, wherein said extension members comprise angular elements welded into recesses formed in said bottom plate.

17. A pan according to claim 1, said bottom plate pivoting about edge means of said pocket, said edge means being spaced from one of said side walls by a distance greater than the thickness of said extension member.

* * * * *